US010235698B2

(12) United States Patent
Marathe

(10) Patent No.: US 10,235,698 B2
(45) Date of Patent: Mar. 19, 2019

(54) SOUND CODE RECOGNITION FOR BROADCAST MEDIA

(71) Applicant: AT&T INTELLECTUAL PROPERTY I, L.P., Atlanta, GA (US)

(72) Inventor: Nikhil S. Marathe, Palatine, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 3 days.

(21) Appl. No.: 15/444,431

(22) Filed: Feb. 28, 2017

(65) Prior Publication Data

US 2018/0247657 A1 Aug. 30, 2018

(51) Int. Cl.
*G06Q 30/02* (2012.01)
*H04L 29/08* (2006.01)

(52) U.S. Cl.
CPC .......... *G06Q 30/0277* (2013.01); *H04L 67/02* (2013.01)

(58) Field of Classification Search
None
See application file for complete search history.

(56) References Cited

U.S. PATENT DOCUMENTS

| 6,505,160 | B1 | 1/2003 | Levy et al. |
|---|---|---|---|
| 7,188,186 | B1 | 3/2007 | Meyer et al. |
| 7,773,751 | B2 | 8/2010 | Shin et al. |
| 8,078,301 | B2 | 12/2011 | Srinivasan |
| 8,135,333 | B2 | 3/2012 | Thomas et al. |
| 8,331,542 | B2 | 12/2012 | Crausaz et al. |
| 8,989,883 | B2 | 3/2015 | Goyal et al. |
| 9,048,963 | B1 | 6/2015 | Paulus |
| 9,191,707 | B2 | 11/2015 | Jones et al. |
| 9,277,263 | B2 | 3/2016 | Smith et al. |
| 2002/0157111 | A1 | 10/2002 | Reams et al. |
| 2007/0223668 | A1 | 9/2007 | Blumenfeld et al. |
| 2012/0158550 | A1 | 6/2012 | Rhoads et al. |
| 2012/0197648 | A1 | 8/2012 | Moloney et al. |
| 2012/0209949 | A1 | 8/2012 | Deliyannis et al. |

(Continued)

FOREIGN PATENT DOCUMENTS

| CN | 101827250 B | 8/2013 |
|---|---|---|
| KR | 100950856 B1 | 3/2010 |

(Continued)

OTHER PUBLICATIONS

Madhavapeddy, Anil et al., "Audio networking: the forgotten wireless technology", Pervasive Computing, IEEE 4.3, 2005, 55-60.

(Continued)

*Primary Examiner* — Curtis A Kuntz
*Assistant Examiner* — Kenneth H Truong
(74) *Attorney, Agent, or Firm* — Guntin & Gust, PLC; Mark Wilinski

(57) ABSTRACT

Aspects of the subject disclosure may include, for example, a device that includes a processor and a memory that stores executable instructions that, when executed by the processor, facilitates performance of operations of monitoring a microphone to detect an audio code, logging a date and time when the audio code is detected, determining a location of the device when the audio code is detected and performing an action based on the date and time, the location, and the audio code. Other embodiments are disclosed.

20 Claims, 7 Drawing Sheets

(56) References Cited

U.S. PATENT DOCUMENTS

| | | | |
|---|---|---|---|
| 2012/0253826 A1 | 10/2012 | Kitazato et al. | |
| 2013/0110822 A1* | 5/2013 | Ikeda | G06F 17/3087 |
| | | | 707/722 |
| 2013/0201399 A1 | 8/2013 | Kitazato et al. | |
| 2013/0204415 A1 | 8/2013 | Fregley et al. | |
| 2013/0279699 A1* | 10/2013 | Suzuki | H04R 5/04 |
| | | | 381/2 |
| 2014/0007153 A1 | 1/2014 | Nielsen et al. | |
| 2014/0304068 A1 | 10/2014 | Weinblatt et al. | |
| 2015/0046560 A1 | 2/2015 | Alibakhsh et al. | |
| 2015/0085057 A1 | 3/2015 | Ouyang et al. | |
| 2015/0127258 A1* | 5/2015 | Mont-Reynaud | |
| | | | G01C 21/3679 |
| | | | 701/539 |
| 2015/0221316 A1 | 8/2015 | Mufti | |
| 2015/0378587 A1* | 12/2015 | Falaki | H04L 67/02 |
| | | | 715/747 |
| 2018/0129533 A1* | 5/2018 | Pashov | G06F 9/4881 |

FOREIGN PATENT DOCUMENTS

| | | |
|---|---|---|
| KR | 20120119142 A | 10/2012 |
| WO | 0148661 A2 | 7/2001 |
| WO | 2002003328 | 1/2002 |
| WO | 2015168697 A1 | 11/2015 |

OTHER PUBLICATIONS

Madhavapeddy, Anil et al., "Contextaware computing with sound", UbiComp 2003: Ubiquitous Computing. Springer Berlin Heidelberg, 2003.

Sobel, Lionel S., "DRM as an enabler of business models: ISPs as digital retailers", Berkeley Technology Law Journal, 2003, 667-695.

Ziegler, Christoph, "Second screen for HbbTVAutomatic application launch and apptoapp communication enabling novel TV programme related secondscreen scenarios", Consumer Electronics?? Berlin (ICCE-Berlin), IEEE Third International Conference on IEEE, 2013.

* cited by examiner

100

SOUND CODE RECOGNITION FOR BROADCAST MEDIA

FIELD OF THE DISCLOSURE

The subject disclosure relates to an audio code. In particular, the subject disclosure is related to a mobile application that performs actions responsive to detecting an audio code.

BACKGROUND

Automatic speech recognition is a technology that enables the recognition and translation of spoken language into text by computers. Audio watermarking is a process of embedding a unique electronic identifier in an audio signal, typically used to identify ownership or copyright in an audio work. Quick response (QR) codes are a type of optical matrix barcode that have become widely used by people to quickly look up websites, register for events, open a Uniform Resource Identifier (URI), or compose an email or text message.

QR codes may store addresses and URLs that may appear in magazines, on signs, on buses, on business cards, or on almost any object about which a user might want information. Mobile device applications (apps) have become ubiquitous for scanning QR codes. Users typically scan the image of the QR code to display text, contact information, connect to a wireless network, or open a web page in the mobile device browser.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a system that detects an audio code embedded in sound waves, determines an action based on the when the audio code was detected, where the audio code was detected, and the audio code itself. Other embodiments are described in the subject disclosure.

One or more aspects of the subject disclosure include a device, comprising: a processing system including a processor; and a memory that stores executable instructions that, when executed by the processing system, facilitate performance of operations, comprising: monitoring a microphone to detect an audio code; logging a date and time when the audio code is detected; determining a location of the device when the audio code is detected; and performing an action based on the date and time, the location, and the audio code.

One or more aspects of the subject disclosure include a machine-readable storage medium, comprising executable instructions that, when executed by a processing system including a processor, facilitate performance of operations, comprising: deciphering a code detected from sound waves; recording time information from when the code was detected; forming location information by locating where the code was detected; submitting the code, the time information and the location information in a submission to a URL; receiving response information based on the submission; and performing an action based on the response information.

One or more aspects of the subject disclosure include a method of receiving, by a processing system including a processor, a code, time information and location information from a device over a network, wherein the code corresponds to an audio code embedded in broadcast media detected by the device, the time information corresponds to when the device detected the audio code, and the location information corresponds to where the device detected the audio code; and sending, by the processing system, response information instructing the device to take an action responsive to the response information, wherein the action is based on the code, time information and location information.

Figure 1:
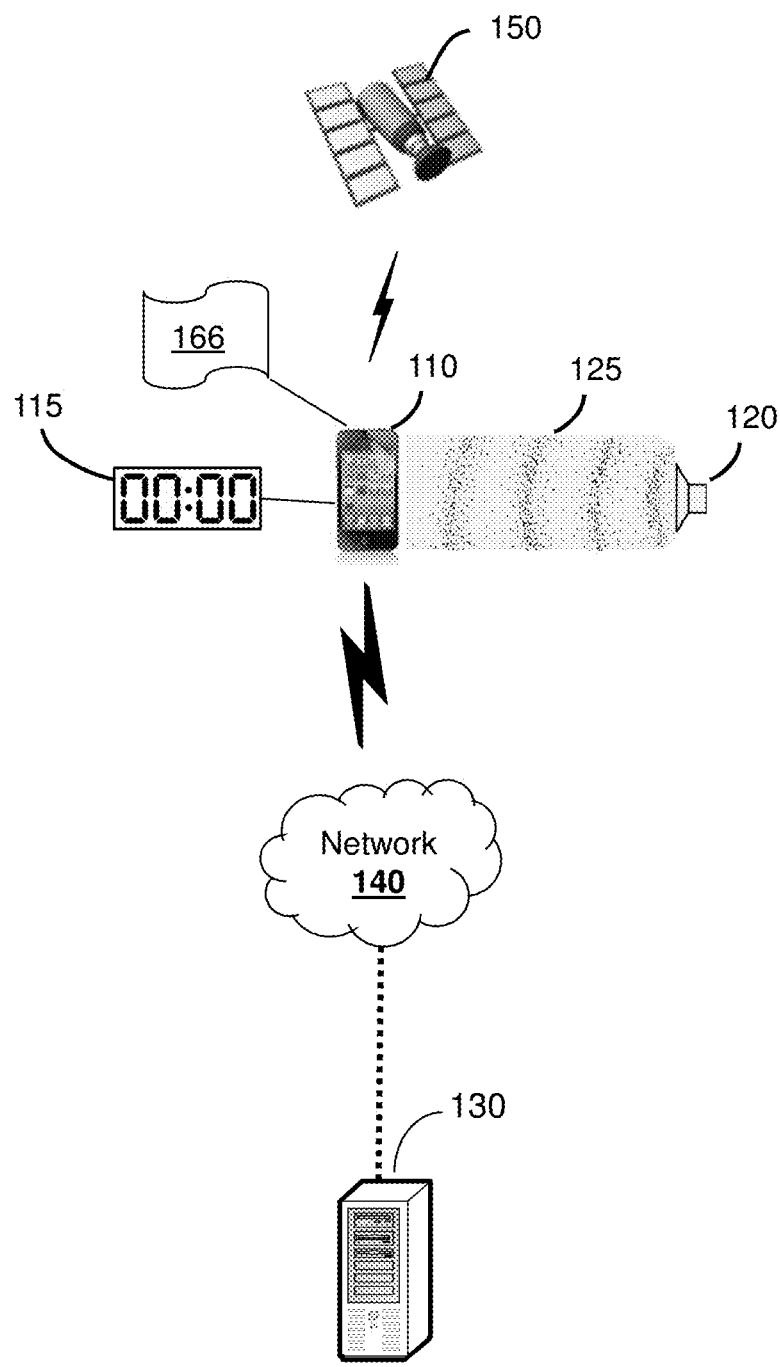
FIG. 1 depicts an illustrative embodiment of a system for recognizing sound codes from broadcast media.

FIG. 1 depicts an illustrative embodiment of a system 100 for recognizing sound codes from broadcast media. As shown in FIG. 1, system 100 comprises a device 110, a sound source 120, a server 130 and a network 140. Device 110 comprises an internal clock 115. Device 110 also comprises an app 166 that detects audio codes and triggers actions for device 110.

Device 110 is communicatively coupled to network 140. Network 140 provides communications between device 110 and server 130. Network 140 may comprise any communication network or combination of networks, including a cellular network, a local area Wi-Fi network, the Internet, or the like. In an embodiment, device 110 comprises a mobile device communicatively coupled by a wireless network. For purposes of discussion below, device 110 will be referred to as a mobile device; however, it should be understood that in an alternative embodiment, device 110 may comprise a media player, such as a set-top box communicatively coupled by a wireless or hardwired network.

Server 130 provides electronic data and processing services to mobile device 110. For example, server 130 may serve web pages requested by mobile device 110, provide time synchronization for internal clock 115, etc.

Sound source 120 may comprise any broadcast media source. Broadcast media may include any source of sound, such as a radio or television station, internet streaming media, compact disc, memory card, podcast, or the like. One or more audio codes 125 are present or embedded in the sound waves emanating from sound source 120. Audio codes 125 may be audible to the human ear of a listener, or inaudible to the listener. For example, with the advent of high fidelity audio broadcast on HD radio, an entire URL can be encoded in a short audio burst of less than a second. The audio burst may or may not be perceptible to the human ear (see, e.g., U.S. Pat. No. 8,055,505, regarding digital audio watermarking, which is incorporated by reference herein). In one embodiment, a portion of the audio code 125 can be audible to the human ear (e.g., an initial part of audio burst) while another portion of the audio code is not (e.g., remainder of audio burst).

In an embodiment, an audio code 125 can be a series of unique audio signal frequencies that, when detected by a mobile device 110 running app 166, will trigger mobile device 110 to take follow-up action, much like a QR code does when scanned by a mobile device with an optical reader. For example, the audio code 125 may assist persons listening to a radio program, or even watching a television program, by automatically open website(s) for more information, pay membership dues, buy items being described by the program, etc.

App 166 could run in the background of the mobile device and take follow-up action merely upon recognizing audio code 125. In contrast, a media viewer seeing a QR code in a program, billboard, or other media might have to start a QR code scanner application and scan the QR code before their mobile device would take follow-up action. Furthermore, a listener to an audio-only media would not have the option of scanning a QR code. In such case, the listener would have to remember the URL for a website referenced in the audio program, and key that URL into a browser on their mobile device to take follow-up action, which can be an error-prone evolution. In an embodiment, to avoid unnecessary follow-up action, app 166 triggered by an audio code 125 could pop up a window and query a user of mobile device 110 if they would like to take the follow-up action.

System 100 may optionally comprise plural global positioning satellites 150 that provide radio frequency signals detected by mobile device 110, enabling mobile device 110 to locate its own position. Alternatively, mobile device 110 may use other means known in the art to detect its own location.

In an embodiment, a user of mobile device 110 has loaded app 166, which is running in the background of mobile device 110. An audio code 125 is broadcast by a radio or television program that the user is listening to. App 166 retrieves the date and time from internal clock 115 and the location of mobile device 110. App 166 then determines the follow up-action based on the date/time, location, and audio code detected. In an embodiment, audio code 125 detected by app 166 is deciphered and translated into a URI for a website or other Internet service. For example, a browser could automatically open and request a web page based on a URL detected by app 166 from the audio code 125. App 166 might pass on its location as a parameter to the URL. Server 130 could be designed to redirect the web page request based on the time of the day and location where mobile device 110 detected the audio code 125.

For example, the broadcast might be an advertisement for a national Chinese restaurant chain. On a weekday, the URL could redirect the request to GPS directions for a nearby Chinese restaurant in the chain based on the location. Alternatively, the audio code may decipher into a URI that could cause a telephone application to enter digits for the telephone number of a reservation line of a nearby restaurant. When after normal business hours, or in a different city where no restaurant in the chain is located, the URL could redirect the mobile device to a website for the chain, where various offers or promotions could be presented to the user in furtherance of the advertisement.

In yet another example, the broadcast might be a news program. The URL detected by app 166 from an audio code 125 presented during the news program may direct a web browser to load a page providing more news concerning a topic being discussed. As an illustration, the news might announce that court papers might be filed in a case garnering national attention. The URL might correspond to a copy of the court papers made available on a publicly accessible website. As discussed above, app 166 may give the user an option whether to download the copy of the papers, or to skip such follow-up action.

As yet another illustration, the broadcast might be a television show about health and fitness. The show may present preparing a particular dish, and include an audio code 125 that provides a URL for a web page providing a recipe for the dish. Alternatively, the audio code 125 provides a URI for a web-based order for goods or services, such as a grocery list of the items needed to for the dish that can be purchased from a vendor located near device 110.

In another example, the broadcast might be from a public radio station. The URL detected from the audio code could be to a server that accepts payment for membership dues for the public radio station.

A further illustration might be for a broadcast of a live concert performance by a band on a nationwide tour. The URL detected from the audio code could be to a server that enables the user to book tickets for a concert performed in the future near the location of the mobile device.

In another embodiment, audio code 125 might be detected by app 166. App 166 might pass along the detected code, the date/time that the code was detected, and the location of mobile device 110 when the code was detected to server 130. This information could be passed along as parameters of an HTTP request to server 130, for example. Server 130 would then process the information provided by app 166, and then provide a service or information based on the information provided. For example, server 130 could redirect an HTTP request made by the app based on the time of the day and location the sound was detected. The action taken would be determined by server 130, based on the audio code detected, the time of day, and the location. For example, on a weekday, the URL could be redirect by server 130 to GPS directions for a restaurant nearby based on the location, while after hours or in a location without such restaurant, server 130 could redirect the request to a website.

Figure 2:
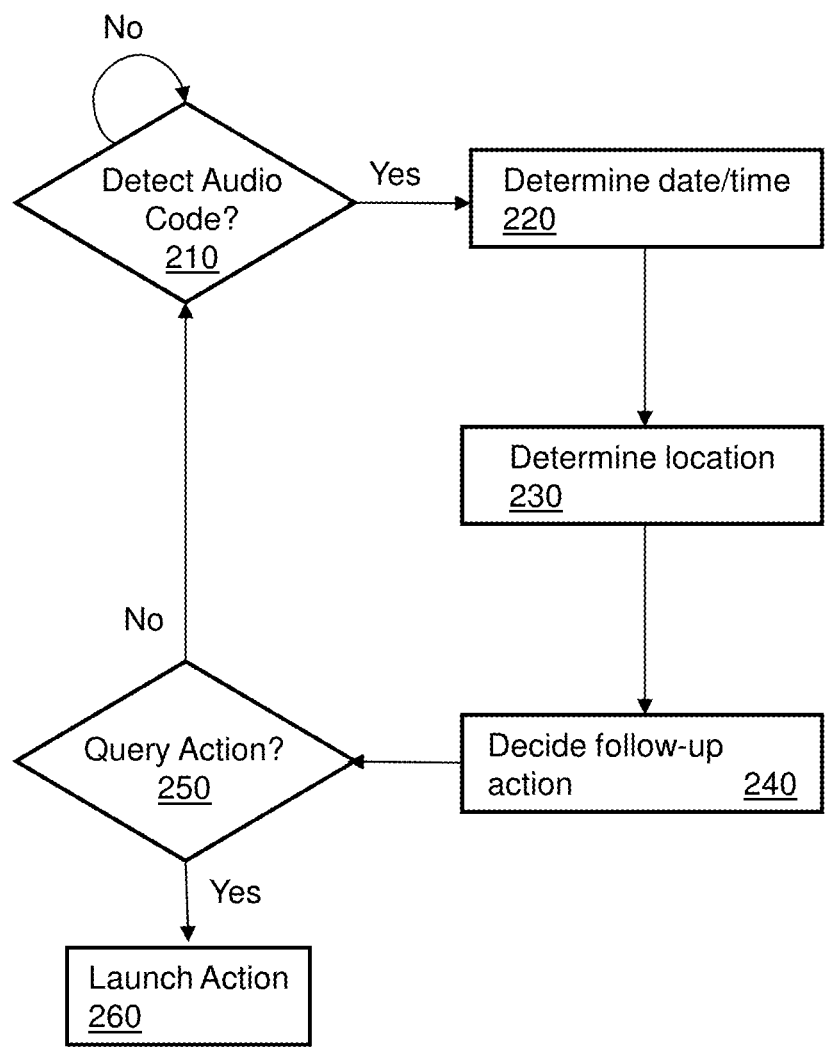
FIG. 2 depicts an illustrative embodiment of a process used in portions of the system described in FIG. 1 for recognizing sound codes from media.

FIG. 2 depicts an illustrative embodiment of a process 200 used by system 100. As shown in FIG. 2, the process begins with step 210, where a device monitors for an audio code. As discussed above, the monitoring can be done in the background while operating the device. Once an audio code is detected, the process moves to step 220.

In step 220, the device determines the current date and time when the audio code was detected, and the method proceeds to step 230.

In step 230, the device determines its current location. Location can be determined generally or precisely, by many methods that are well known in the art, including IP address lookup or receiving a GPS signal.

The process continues in step 240, where the device determines what follow-up action should be taken based on the audio code received, the date/time, and the location of the device.

In step 250, the device queries the user whether to take the follow-up action determined in step 240. If the user decides not to take the follow-up action, the process returns to step 210 to continue monitoring for another audio code.

On the other hand, if the user elects to proceed with the follow-up action, the process continues to step 260. In step 260, the device executes the follow-up action, which may comprise receiving information, such as a web page, from server 130 or the like as described above.

Figure 3:
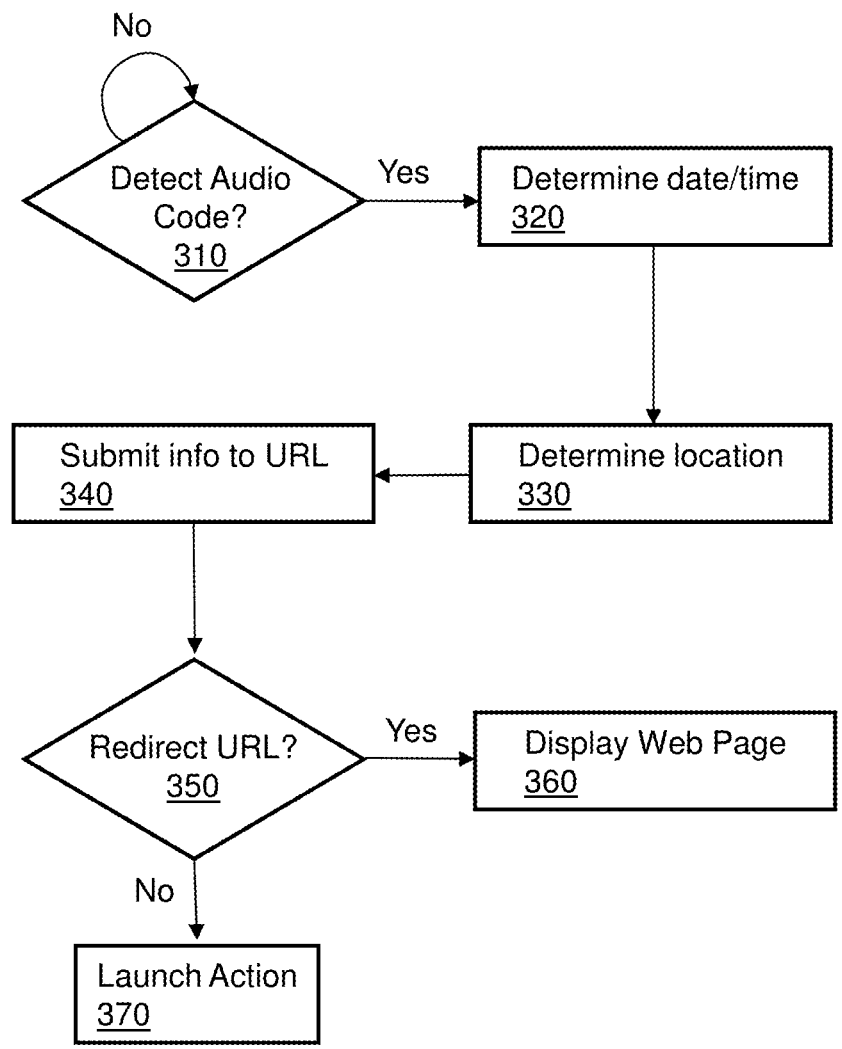
FIG. 3 depicts an illustrative embodiment of another method used by a system used in portions of the system described in FIG. 1 for recognizing sound codes from media.

FIG. 3 depicts an illustrative embodiment of another method 300 used by system 100. As shown in FIG. 3, the process begins with step 310, where a device monitors for an audio code. Once an audio code is detected, the process moves to step 320.

In step 320, the device determines the current date and time when the audio code was detected, and the method proceeds to step 330.

In step 330, the device determines its current location, and the process continues with step 340.

In step 340, the device provides the detected code, the date/time and the location to a server via an HTTP request at a predefined URL. The detected code, the date/time and the location may be passed as parameters to the HTTP request. Next, the process continues to step 350.

In step 350, the server receives the information provided by the device and determines whether to redirect the device's request. If the server decides that the request should be redirected, based on the information provided, then the process continues at step 360.

In step 360, the server redirects the request to a different URL, where another server services the HTTP request. For example, another server may return a document, such as a web page, to the device, which displays said web page in a browser.

Alternatively, if the server decides in step 350 that the request should not be redirected, it may return information to the device that causes the device to execute another action. Such action might be to launch a particular app. For example, the server might return geo-coordinates for a navigation app to provide navigation instructions to a particular location. As another example, the server might return a URI causing the device to place a telephone call to a telephone number embedded in the URI.

While for purposes of simplicity of explanation, the respective processes are shown and described as a series of blocks in FIGS. 2 and 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
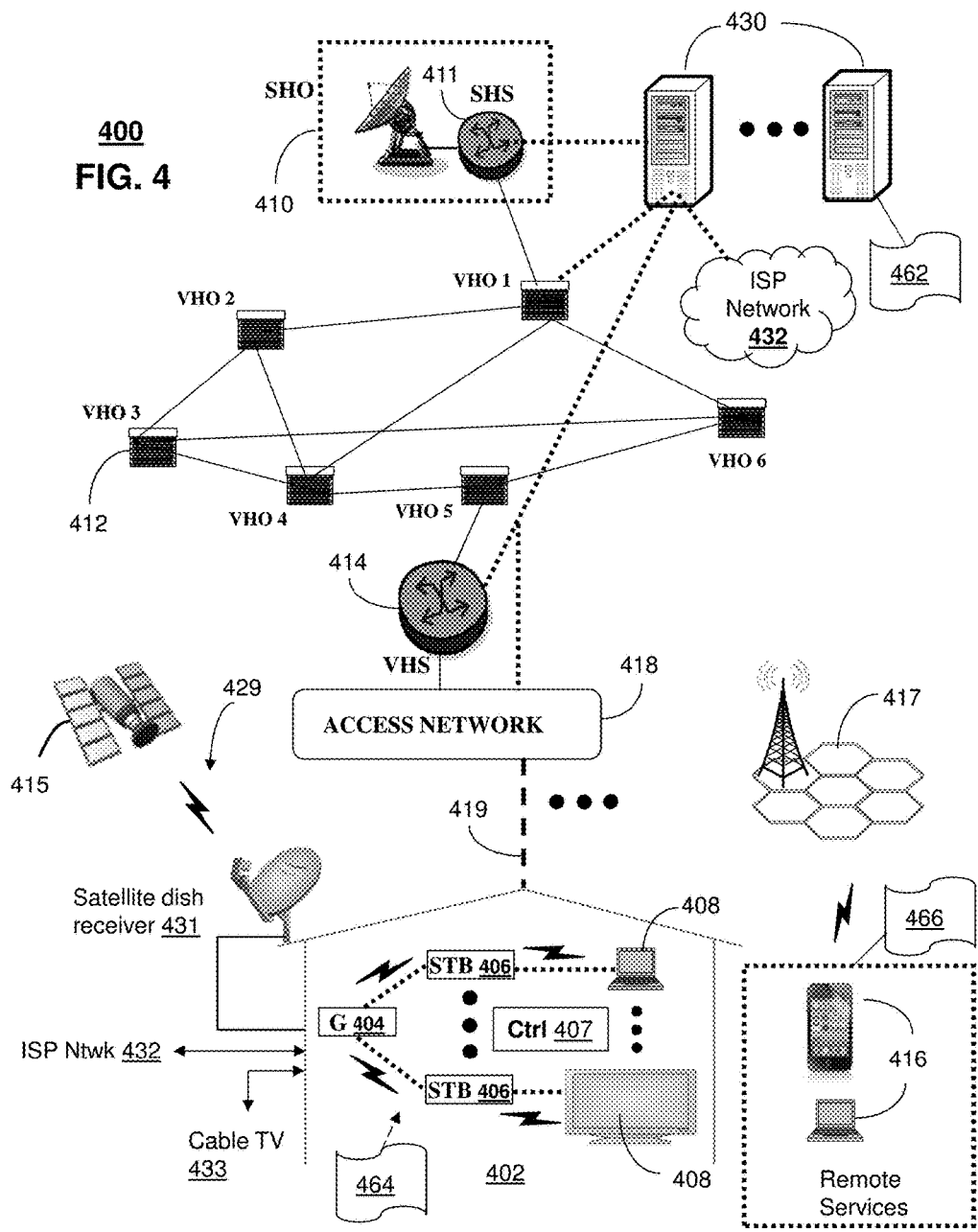
FIGS. 4-5 depict illustrative embodiments of communication systems that provide media services to the system described in FIG. 1.

FIG. 4 depicts an illustrative embodiment of a first communication system 400 for delivering media content. The communication system 400 can represent an Internet Protocol Television (IPTV) media system. Communication system 400 can be overlaid or operably coupled with the system 100 of FIG. 1 as another representative embodiment of communication system 400. For instance, one or more devices illustrated in the communication system 400 of FIG. 4 may provide the structure or perform the functions of device 110, sound source 120, server 130, network 140 or satellite 150. Such functions may include deciphering a code detected from sound waves, identifying a location where the code was detected, determining a URL to submit code, time and location information, and determining an action to perform based on the code, time and location information.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as server 130 described in FIG. 1 (herein referred to as web server 430). The web server 430 can use computing and communication technology to perform function 462, which can include among other things, the electronic service techniques described by step 260 in method 200 of FIG. 2 or as described by steps 350, 360 and 370 in method 300 of FIG. 3. For instance, function 462 of server 430 can be similar to the functions described for server 130 of FIG. 1 in accordance with methods 200 or 300. The media processors 406 and wireless communication devices 416 can be provisioned with software functions 466 to utilize the services of web server 430. For instance, functions 464 of media processors 406 and functions 466 of wireless communication devices 416 can be similar to the functions described for device 110 of FIG. 1 in accordance with methods 200 and 300 of FIGS. 2 and 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
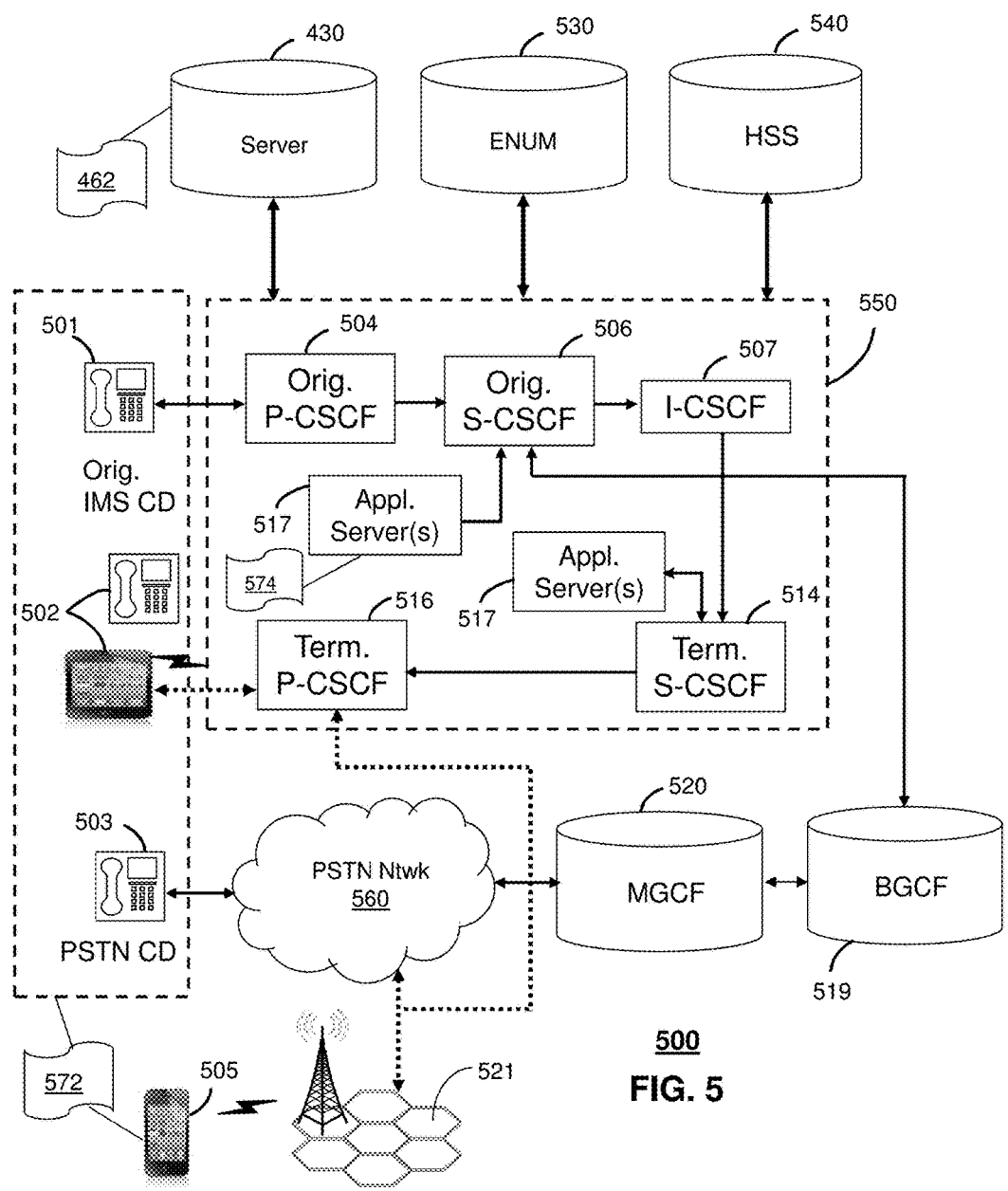

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. Communication system 500 can provide assistance with or performance of functions performed by system 100 or communication system 400, such as deciphering a code detected from sound waves, identifying a location where the code was detected, determining a URL to submit code, time and location information, and determining an action to perform based on the code, time and location information.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The web server 430 of FIG. 4 can be operably coupled to communication system 500 for purposes similar to those described above. Web server 430 can perform function 462 and thereby provide web page services to the CDs 501, 502, 503 and 505 of FIG. 5 similar to the functions described for server 130 of FIG. 1 in accordance with methods 200 and 300 of FIGS. 2 and 3. CDs 501, 502, 503 and 505, which can be adapted with software to perform function 572 to utilize the services of the widget 430 similar to the functions described for device 110 of FIG. 1 in accordance with methods 200 and 300 of FIGS. 2 and 3. Web server 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
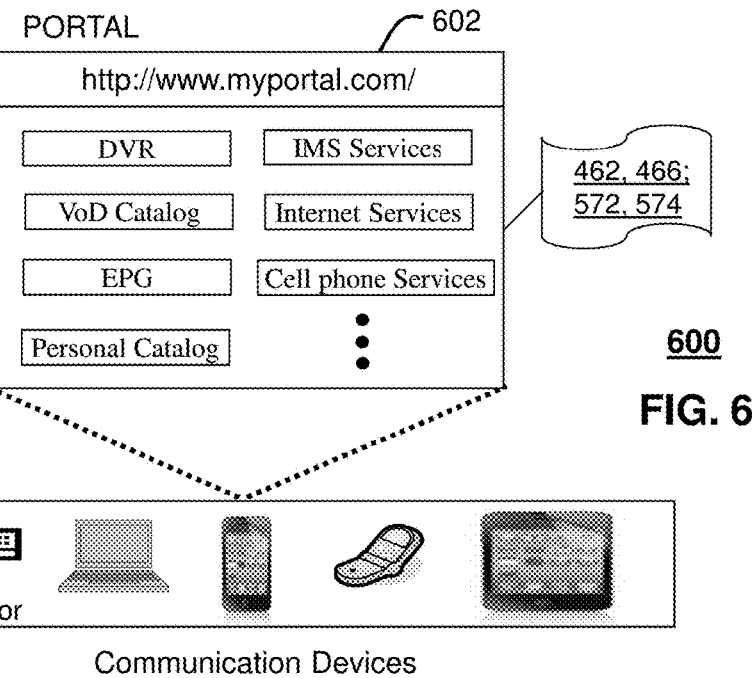
FIG. 6 depicts an illustrative embodiment of a web portal for interacting with the communication systems of FIGS. 1 and 4-5.

FIG. 6 depicts an illustrative embodiment of a web portal 602 of a communication system 600. Communication system 600 can be overlaid or operably coupled with system 100 of FIG. 1, communication system 400, and/or communication system 500 as another representative embodiment of system 100 of FIG. 1, communication system 400, and/or communication system 500. The web portal 602 can be used for managing services of system 100 of FIG. 1 and communication systems 400-500. A web page of the web portal 602 can be accessed by a Uniform Resource Locator (URL) with an Internet browser using an Internet-capable communication device such as those described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462, 466, 572 and 574 to adapt these applications as may be desired by subscribers and/or service providers of system 100 of FIG. 1, and communication systems 400-500. For instance, users of the services provided by server 130 or server 430 can log into their on-line accounts and provision the servers 110 or server 430 with preferences, settings, or options when detecting audio codes, as described in FIGS. 1-3 to enable or enhance communications with devices described in FIGS. 1-5, and so on. Service providers can log onto an administrator account to provision, monitor and/or maintain the system 100 of FIG. 1 or server 430.

Figure 7:
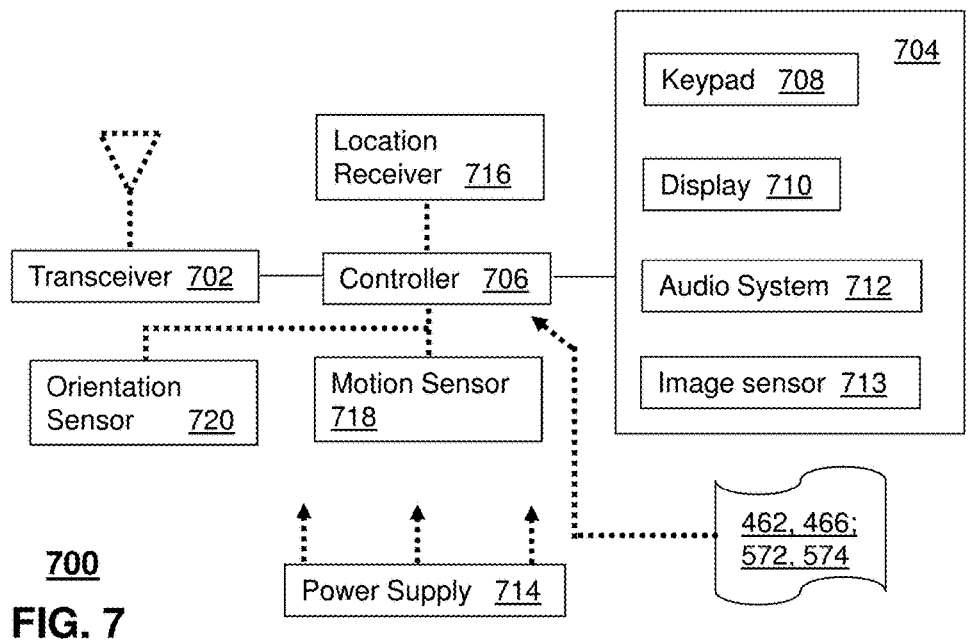
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIG. 1, and FIGS. 4-5 and can be configured to perform portions of methods 200 or 300 of FIG. 2 or 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of device 100 of FIG. 1, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in system 100 of FIG. 1, communication systems 400-500 of FIGS. 4-5 such as a gaming console and a media player. In addition, the controller 706 can be adapted in various embodiments to perform the functions 462, 466, 572 and 574, respectively.

Upon reviewing the aforementioned embodiments, it would be evident to an artisan with ordinary skill in the art that said embodiments can be modified, reduced, or enhanced without departing from the scope of the claims described below. For example, device 110 could pass along source information identifying the source of the sound waves, such as a radio station identifier, television channel identifier, streaming internet provider, etc. along with the code/time/location information detected, which can assist server 130 with authenticating the audio code detected, and preventing false positive detections. In addition, such source information can be used for other purposes, such as audience monitoring or promotional activities. For example, if sufficient code detections are identified that exceeds a predetermined threshold, server 130 may offer group coupons or group discounts. In a further example, the server may delay triggering the action taken by the device, until some threshold of detections are met. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
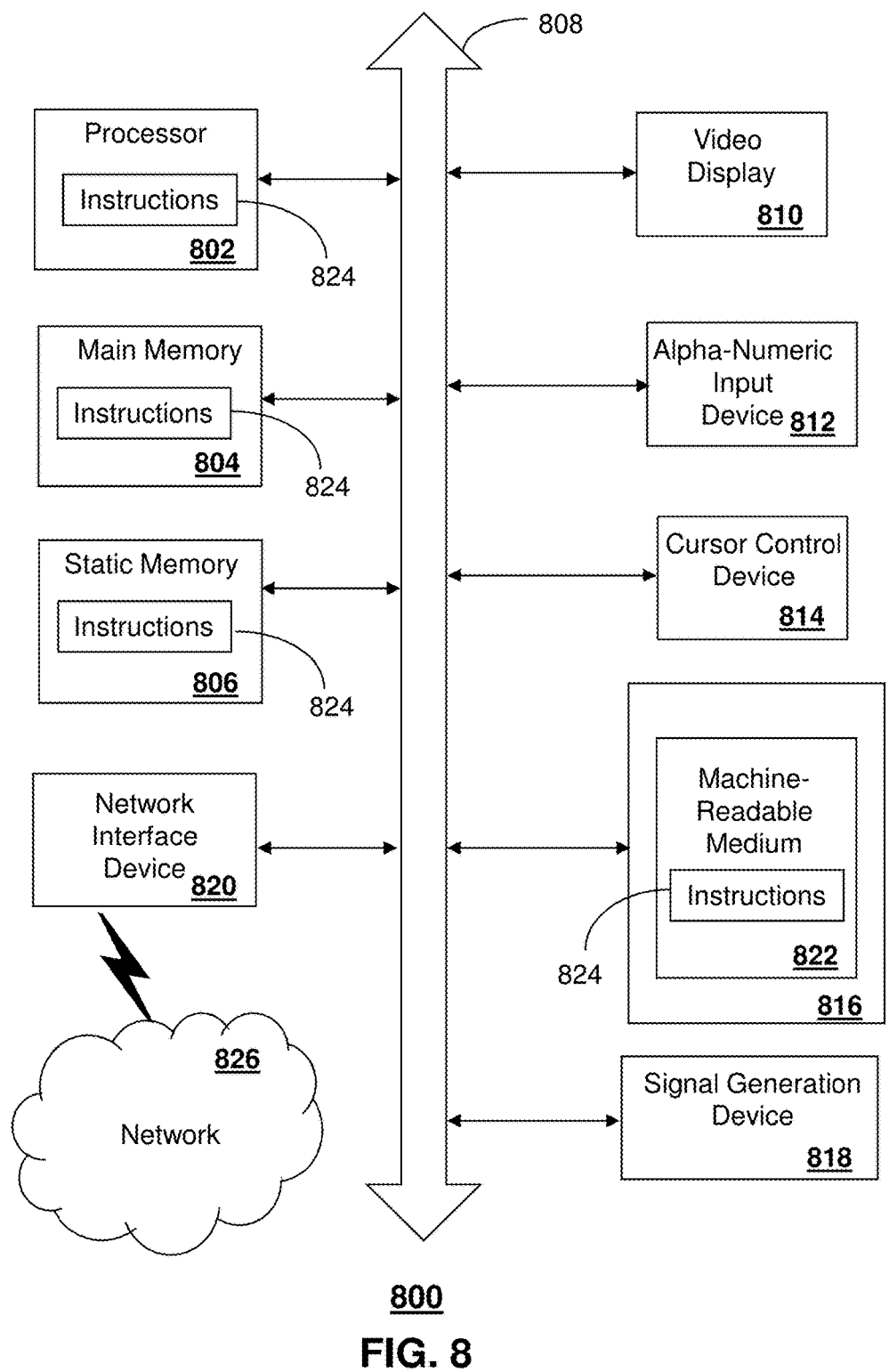
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the web server 430, the media processor 406, server 130 and other devices of FIGS. 1-6. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, the operations comprising:
monitoring a microphone to detect an audio code;
logging a date and time when the audio code is detected;
determining a location of the device when the audio code is detected; and
performing an action based on the date and time when the audio code was detected, the location of the device when the audio code was detected, and the audio code,
wherein the action comprises submitting a request to a server at a URL associated with the audio code, and
wherein the action comprises receiving response information based on the request, wherein the response information includes redirected information based on the URL having been redirected by the server.

2. The device of claim 1, wherein the request comprises an HTTP request.

3. The device of claim 2, wherein the location and the date and time are passed as parameters included in the HTTP request, and the processing system comprises a plurality of processors operating in a distributed processing environment.

4. The device of claim 1, wherein the action comprises calling a telephone number associated with the audio code.

5. The device of claim 1, wherein the action comprises downloading a document associated with the audio code.

6. The device of claim 1, wherein the action comprises placing an order for goods or services associated with the audio code.

7. The device of claim 1, wherein the audio code is embedded in an advertisement.

8. The device of claim 1, wherein the operations further comprise querying a user of the device to determine whether to perform the action.

9. The device of claim 1, wherein the processor comprises a plurality of processors operating in a distributed processing environment.

10. A non-transitory, machine-readable storage medium, comprising executable instructions that, when executed by a processing system including a processor, facilitate performance of operations, the operations comprising:
- deciphering a code detected from sound waves;
- recording time information from when the code was detected;
- forming location information by locating where the code was detected;
- submitting the code, the time information and the location information in a submission to a URL;
- receiving response information based on the submission, wherein the response information includes redirected information based on the URL having been redirected; and
- performing an action based on the response information.

11. The non-transitory, machine-readable storage medium of claim 10, wherein the processing system comprises a plurality of processors operating in a distributed processing environment and the action comprises providing navigation instructions to a location identified in the response information.

12. The non-transitory, machine-readable storage medium of claim 10, wherein the action comprises displaying a web page based on the response information.

13. The non-transitory, machine-readable storage medium of claim 10, wherein the action comprises soliciting an order for goods or services identified in the response information.

14. The non-transitory, machine-readable storage medium of claim 10, wherein the action comprises placing a telephone call to a number identified in the response information.

15. A method, comprising:
- receiving, by a processing system including a processor, a code, time and date information and location information from a device over a network in an HTTP request, wherein the code corresponds to an audio code embedded in broadcast media detected by the device, the time information corresponds to when the device detected the audio code, and the location information corresponds to where the device detected the audio code, the code includes a first URL detected by the device;
- sending, by the processing system, response information instructing the device to take an action responsive to the response information, wherein the action is based on the code, time information and location information; and
- redirecting, by the processing system, the HTTP request to a second URL based on the code, the time and date information and the location information.

16. The method of claim 15, wherein the broadcast media comprises a radio program.

17. The method of claim 15, wherein the broadcast media comprises a television program.

18. The method of claim 15, wherein the broadcast media comprises audio streamed over an Internet, a podcast, an audio recording, or a combination thereof.

19. The method of claim 15, wherein at a first time and on a first day identified by the time and date information the HTTP request is redirected to GPS directions for an establishment that is near a location identified by the location information.

20. The method of claim 19, wherein at a second time and on a second day identified by the time and date information the HTTP request is redirected to a website, wherein the second time is different from the first time, and wherein the second day is different from the first day.

* * * * *